April 10, 1934.          T. E. HEPPENSTALL          1,954,242
DOVETAIL SPRING JOINT
Filed July 28 1932          2 Sheets-Sheet 1

INVENTOR
Thomas E. Heppenstall
BY
G. Wright Arnold.
ATTORNEY

April 10, 1934. T. E. HEPPENSTALL 1,954,242
DOVETAIL SPRING JOINT
Filed July 28, 1932 2 Sheets-Sheet 2
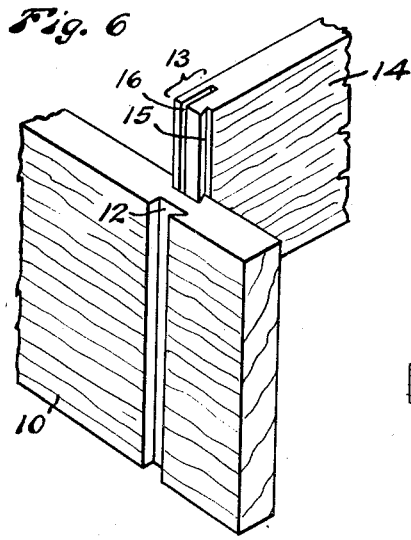
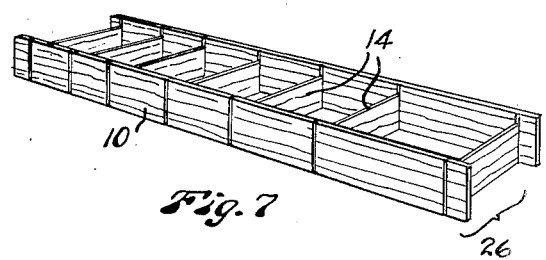
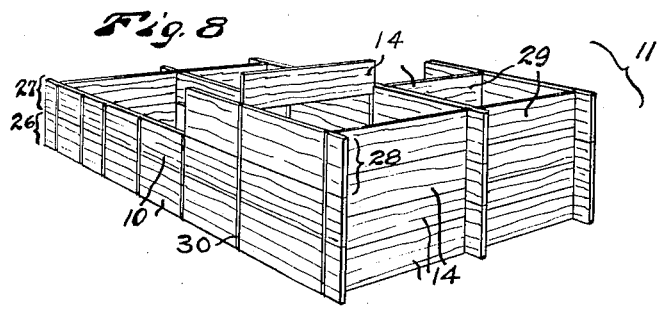
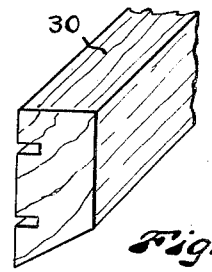
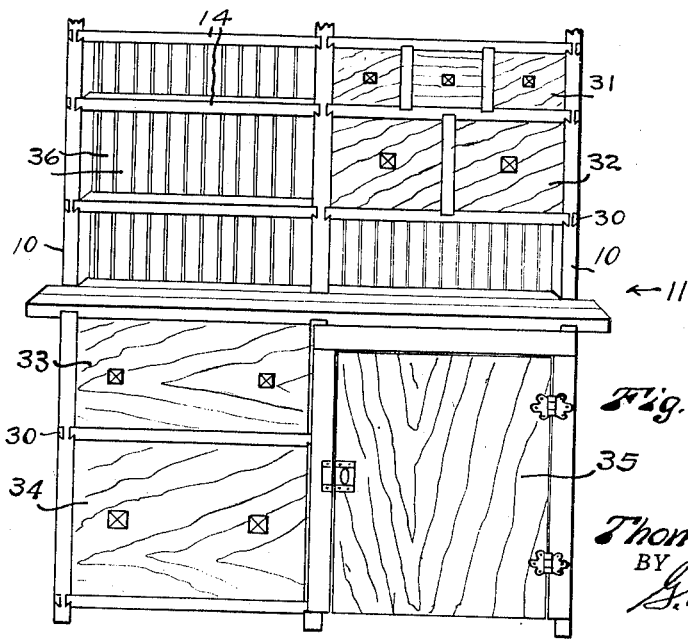
INVENTOR
Thomas E. Heppenstall
BY
G. Wright Arnold
ATTORNEY Patented Apr. 10, 1934

1,954,242

UNITED STATES PATENT OFFICE 1,954,242

DOVETAIL SPRING JOINT

Thomas E. Heppenstall, Longview, Wash.

Application July 28, 1932, Serial No. 625,346

4 Claims. (Cl. 20—92)

My invention relates to a dove-tail spring joint.

It may be used in general woodwork construction. By way of illustrating and typifying, but not thereby limiting its use, the following applications may be cited: toys, animal troughs, window boxes, bins, household devices, cabinets, shelving, building construction, etc. Such joint of my invention is characterized by the accuracy of machine work, and is rendered tight fitting with the required cabinet nicety of fitting, even though the assembling be at a remote time from the time of making, so that the moisture content has been greatly altered from that obtaining at the time of the making of the parts, and even though deformation has occurred in the joint parts due to stresses inherent in wood.

For purposes of clearness and definiteness of illustration and construction, I will describe my invention as applied to the manufacture of a cabinet, but let it be distinctly understood that the invention is not to be limited to any such specific article of construction, as it is equally applicable to other articles as indicated above.

According to the practices of construction heretofore commonly in use when furniture was made with an interlocking joint, the assembly had to take place directly after manufacturing, in order to insure that the parts would fit together. The dimensions of a manufactured piece of lumber vary with the moisture content of that piece; as the lumber absorbs moisture from the air it swells, and as it gives up moisture to the air it shrinks. Hence furniture had to be assembled at the place of manufacture forthwith. The shipping rates for such a finished article are far in excess of the shipping rates for the parts not assembled, or in knock-down form.

A primary object of my invention is to provide a dadoed joint of a character which will permit the parts of the cabinet, or other article to be manufactured by machinery, and therefore possess the precision and nicety characteristic of machine-made parts. The parts having the joint of my invention may then be shipped in knock-down condition to a user, and assembled at a time remote from the time of making the parts, irrespective of variations due to (a) change in the moisture content of the parts, (b) deformation due to stresses inherent in wood structure, (c) variations in wood texture, and (d) variations due to manufacturing equipment. Such a joint must be one that will uniformly solve the problem for the complete range of said listed variations.

Respecting these variations, the parts of the cabinet are made with the moisture content controlled, and of a magnitude of about 8% on the "bone" dry basis. When it is noted that the acquired moisture condition of the wood, when exposed in different sections of the United States, varies from 5% to 20%, the magnitude of the problem of providing a tight fitting joint is manifest. When a groove is cut out of one side of a piece of wood, manifestly that portion is relieved of stresses therein. This allows the opposite face to equalize its stresses, which thereby results in the deformation of the form of the opening. These stresses generally develop as a result of inequalities of the drying operation, and it is to bring about an equalizing of the stresses that causes the deformation of the opening resulting in cutting away parts.

Again, as to variations due to the wood texture: If the wood texture is hard, manifestly a cutting tool operates more precisely than when the wood texture is soft. In the latter case there is a roughness of the walls of the cut which militates against exactness of fit.

Relative to variation due to manufacturing equipment: it is apparent that when the tools wear, or tend towards dullness that there is a variation in the precision of the parts made by such tools.

To ship an article such as a cabinet, to which the joint is applicable in completed assembled form, the shipping rate would be at least four times as much as it is in the knock-down form. The consequent saving to the user is manifest.

Moreover, it is often desirable to erect shelving in a basement of a size which it is quite impossible to move through the ordinary doors and around the turns that are often necessary in reaching the basement. Accordingly, the providing of the joint embodying my invention permits of the ready assembling of the desired cabinet or shelving in the basement, after the parts are readily brought in in unassembled form.

Furthermore, a primary object of my invention is the solving of the problem of adding to a given unit of construction as a cabinet at a later date, and also it is the object of my invention to make the assembling of such a simple character that a layman, who has not the technical skill, training, or equipment necessary to cut a tight-fitting joint of cabinet maker's nicety, may accomplish the same.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 6 is a view in perspective of a vertical member and a shelf member of a cabinet in partially assembled position, having the dadoed joint embodying my invention.

Figure 7 is a view in perspective of a vertical section of the cabinet embodying my invention.

Figure 8 is a view in perspective of a cabinet partially assembled embodying my invention.

Figure 9 is a fragmentary view of a spline member constituting a detailed part of my invention.

Figure 10 is a front view of the cabinet in upright position.

Figure 1:
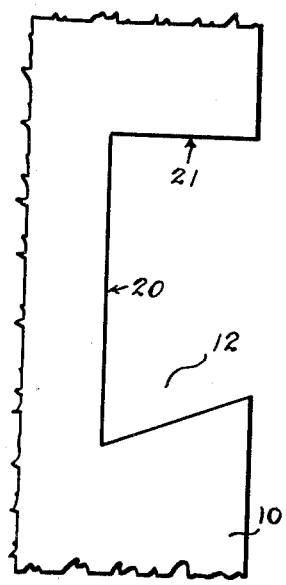
Figure 1 is a view in side elevation of a groove member part of the dadoed joint embodying my invention.
Figure 2:
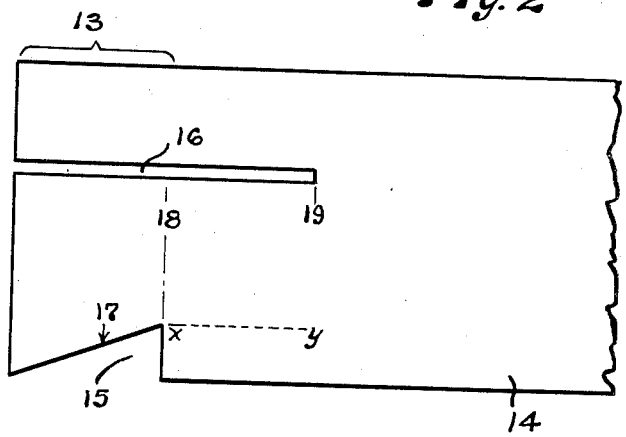
Figure 2 is a view in side elevation of the tongue member part of said joint embodying my invention.

A grooved member 10, which is herein chosen for illustration is one of the upright vertical parts of the cabinet 11, and is provided with a groove 12 to receive the tongue portion 13 of another member 14, said tongue having a half dovetail cut 15. In this tongue 13, a kerf 16 is located, and it is preferably positioned nearer to the side of the tongue opposite to the dadoed cut 15 than to the bottom 17 of the dado cut. The purpose of this kerf is to provide for springing the end portions of the tongue together, so as to compensate for any change in size of the tongue member due to the variations herein listed.

When the parts are manufactured, they are designed to fit with a slight compression in the kerf, i. e., the upper position of the tongue member 13 is slightly sprung toward the dado 15 in assembling. But when the parts reach the user at the time of assembly, the moisture content has been either (a) increased, and therefore there may be considerable compression required to permit the tongue fitting in the groove member, or (b) reduced, so then the degree of springing of the tongue will be decreased so that both conditions are taken into consideration by the joint embodying my invention. If the kerf is not located nearer to the plain side than to the dado side 15, then a weakness, which may result in a splitting of the tongue member, may develop along the dotted line x—y, so that when said tongue is forced into the groove 12 a split will occur along said line x—y. By using the half dove-tail form of joint, provision is made for locating the kerf relatively remotely from the dado side and such locating of the kerf guards against undue weakening of the tongue member. When the parts are manufactured, the moisture content of the lumber is about midway between the minimum and maximum moisture content obtaining in ordinary use, which is about 5% to 12%.

The length of the kerf is important. It is known that the deflection of the beam varies inversely as the cube of the length. The effective length of the kerf must be measured from the inner end 18 of the dado to the point 19. This joint of my invention thus takes advantage of the inherent elasticity quality in wood to keep the joint tight with varying moisture content, and also provides for springing the parts of the tongue to permit the assembly of the joint without injury to the tongue or the walls of the grooved member, even though the dove-tail and the groove be of extended length. After assembly, the kerf in cooperation with the half dove-tail operates to compensate for a variation in size of the tongue and groove due to a change in the moisture content.

For example, after the parts of the joint have been assembled, a shrinkage due to a decrease in moisture content would result as respects the tongue member 13, in tending to contract or loosen the fit, but due to the inclined face of the dove-tail, similar shrinkage in the groove member results in tightening the contact with the back of the dove-tail cut. However, the shrinkage of the wood parts may not be equal and in all probability would not be, but the operation of the kerf provides for springing the end portion of the tongue so as to maintain at all times a tight joint. To provide rigidity of structure, particularly true in shelving, it is obviously necessary to maintain a tight joint at all times. When the groove member shrinks, manifestly by reason of the inclined plane of the dove-tail, the tongue member is pulled tight against the bottom 20 of the groove, and forced against the square shoulder 21 of the groove, so that this along with the tension maintained by reason of the spring action of the kerf insures a positive tight fit without the use of glue or nails, as is customarily used in cabinet work and in the ordinary dove-tail joint work generally. The practice in using a dove-tail joint of the ordinary character is to use glue to fill up the space so that looseness due to shrinkage or imperfections in forming the joint are overcome. However, in shelving it may be desired to disassemble the cabinet or other article involved, and it is the object of my invention to avoid the use of glues and nails, or other means which prevents the ready disassembling of the joint.

The assembling of the parts forming the joint embodying my invention is possible without any tooling, and hence the assembly is rendered possible by a layman without any special machine equipment.

The radial shrinkage of woods ranges from about 2% to 8½%, while the tangential shrinkage ranges from about 4.2% to 14%. The longitudinal shrinkage is negligible for most practical purposes, ranging from $\frac{1}{10}$% to slightly over $\frac{1}{3}$%. Starting with substantially fiber saturation point, (i. e. about 25% moisture content), the shrinkage varies to oven dry, or what is known in the art as "bone" dry, (i. e. 0.0% moisture content). The shrinkage may be considered as varying in a practically straight line relation for practical purposes.

The humidity in a house is such that wood would dry out to a minimum of about 5% and a maximum of 12% under ordinary conditions, while conditions outside oridinarily will vary from 8% to 22%. In practice, a one inch board in a house varies about 1/64 of an inch in thickness when there is a change from 6% to 12% moisture content. For a board to have the proper fit, it must correspond to what machinists call a "press fit." If the joint is to be merely of the length of the order of an inch or less, then obviously the entering member could be driven into place without greatly destroying the abutting wood structure, but when a shelf from 4 to 12″ in width is to be driven into a groove, manifestly the friction would become so great that the wood structure of the abutting edge of the groove or the abutting edge of the wood structure of the tongue would be destroyed. Obviously, the nicety of fit becomes an important matter,—even for the cabinet maker. When it is remembered that the particular structure in question may be assembled by the user who lacks technical skill and equipment, it is obvious that the problem of so making the members for the joint that they can be subsequently assembled without injury and at the same time with the nicety of fit so as to provide rigidity to the structure, the seriousness of the problem is manifest.

Figure 4:
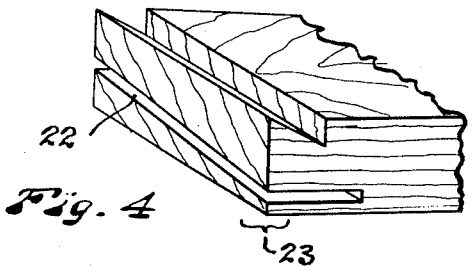
Figure 4 is a view in perspective of a further modified form of a tongue member embodying my invention.
Figure 3:
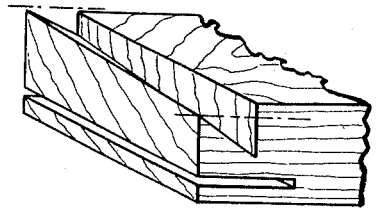
Figure 3 is a view in perspective of a modified form of a tongue member embodying my invention.
Figure 5:
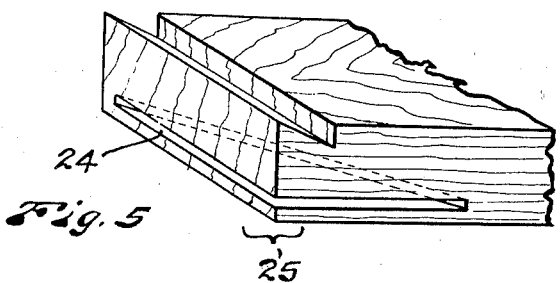
Figure 5 is a view in perspective of still a further modified form of tongue member embodying my invention.

The modified form of the tongue shown in Figure 3, which of course would have a groove member corresponding in form to receive the said tongue, provides for a joint having the dado member wedge shaped, which will facilitate its being assembled when it is intended that the said tongue member shall be driven to a definite point and then stopped. The wedge shape manifestly will stop the lateral travel of the tongue member after it reaches the predetermined point, as determined by the length of the wedge member and the corresponding part of the groove. While the form of tongue member shown in Figure 4, which does not call for a groove different from that shown in Figure 1, provides for a form of tongue member which is intended to be driven to a definite predetermined point. This results from the fact that the kerf 22 is diagonally positioned across the tongue member, so that a ready spring part 23 is provided on one edge of the tongue member, and this edge would be employed as the entering edge in assembling, and as the tongue is forced home, obviously the spring of the part 23 of the tongue lessens as the kerf extends to the following edge, since more and more material is disposed on one side of the kerf. The same general end is obtained in Figure 5, wherein an easy entering edge is provided by means of a kerf 24 which is of triangular form, which thus provides a ready spring member 25 so that an easy entering edge is provided. In Figure 5 the degree of spring on the entering edge is brought about by the length of the kerf, while in Figure 4 the degree of spring results from the thinness of material in the part 23.

In Figure 6 the shelf member 14 having the dadoed tongue portion 13 embodying my invention is partly joined to the upright member 10. Figure 7 shows a vertical section 26 assembled after the manner explained with respect to Figure 6.

In Figure 8 the assembling of the cabinet has proceeded further with the addition of a vertical section 27 which may be of a narrower width than vertical section 26, and there is also added the short vertical section 28 to provide a wide shelf 29 on the cabinet. The vertical sections may be held together by means of a spline member 30.

Figure 9. This member in cross section has a form which fits in the groove 12 disposed in the vertical members 10. To hold these more secure, a small brad may be used which will readily prevent relative movement between the spline and the vertical members. Whenever it becomes desirable to add a further section to the cabinet, these splines may be removed and other shelf members 14 placed therein, and the additional unit added in the same manner as described above for assembling the cabinet. The splines also serve to close up the grooves 12 which are disposed on the outside of the vertical members 10, and thus provide for a neater finish than would otherwise result.

The shelf members 14 preferably vary in width to provide broken joints as between vertical sections 26, 27, and 28, as clearly appears by referring to the bottom shelf members as shown in Figure 8. The drawers 31, 32, 33 and 34 of varying sizes may be provided, if desired, or a hinged door 35 may be provided. In this wise the complete adaptability of the cabinet for varying uses is readily illustrated. Suitable pieces 36 preferably are provided for closing the back of the cabinet.

Obviously, changes may be made in the forms, dimensions, and arrangement of the parts of my invention, without departing from the principle thereof, the above setting forth only a preferred form of embodiment.

I claim:

1. A wooden joint comprising a tongue member provided with a kerf intermediate its respective faces and a rectilinear dovetail cut across a face thereof, thereby providing an inclining tongue face surface; and a groove member provided with a recess, which recess is adapted to laterally receive and interfit with said tongue member, thereby providing an inclining groove surface face, whereby said tongue may be compressed prior to the interfitting of the tongue and groove members and the expansion of the tongue will cause the tongue and groove members to move respectively along said inclined surfaces and tighten the joint.

2. A wooden joint of a half dove-tail type, comprising a tongue member provided with a kerf intermediate its respective faces and a rectilinear dove-tail cut across one face thereof, thereby providing an inclining tongue face surface; and a half dove-tail groove member provided with a recess, which recess is adapted to laterally receive and interfit with said tongue member, thereby providing an inclining groove surface face, whereby said tongue may be compressed prior to the interfitting of the tongue and groove members and the expansion of the tongue will cause the tongue and groove members to move respectively along said inclined surfaces and tighten the joint.

3. A wooden joint of a half dove-tail type, comprising a tongue member provided with a kerf intermediate its respective faces and nearer one face than the other, and a rectilinear dove-tail cut across the tongue face farther removed from said kerf, thereby providing an inclining tongue face surface; and a half dove-tail groove member provided with a recess, which recess is adapted to laterally receive and interfit with said tongue member, thereby providing an inclining groove surface face, whereby said tongue may be compressed prior to the interfitting of the tongue and groove members and the expansion of the tongue will cause the tongue and groove members to move respectively along said inclined surfaces and tighten the joint.

4. A cabinet comprising shelf members having their end portions formed as tongue members, each tongue member provided with a kerf intermediate its respective faces and a rectilinear dove-tail cut across a face thereof, thereby providing an inclining tongue face surface; and upright members provided with grooves, each groove provided with a recess, which recess is adapted to laterally receive and interfit with said tongue member, thereby providing an inclining groove surface face, whereby said tongue may be compressed prior to the interfitting of the tongue and groove members and the expansion of the tongue will cause the tongue and groove members to move respectively along said inclined surfaces and tighten the joint.

THOMAS E. HEPPENSTALL.